US011408641B2

(12) United States Patent
Park et al.

(10) Patent No.: US 11,408,641 B2
(45) Date of Patent: Aug. 9, 2022

(54) BELL MOUTH, AIR SUPPLY ASSEMBLY INCLUDING THE BELL MOUTH, AND AIR SUPPLY CONTROL SYSTEM USING THE BELL MOUTH

(71) Applicant: KYUNGDONG NAVIEN CO., LTD., Gyeonggi-do (KR)

(72) Inventors: Jun Kyu Park, Seoul (KR); Jeon Hur, Seoul (KR); Jeong Gi Yu, Seoul (KR)

(73) Assignee: KYUNGDONG NAVIEN CO., LTD, Gyeonggi-Do (KR)

( * ) Notice: Subject to any disclaimer, the term of this patent is extended or adjusted under 35 U.S.C. 154(b) by 0 days.

(21) Appl. No.: 17/013,103

(22) Filed: Sep. 4, 2020

(65) Prior Publication Data

US 2021/0071911 A1 Mar. 11, 2021

(30) Foreign Application Priority Data

Sep. 11, 2019 (KR) .......................... 10-2019-0113102

(51) Int. Cl.
*F23R 3/04* (2006.01)
*F24H 9/20* (2022.01)
(Continued)

(52) U.S. Cl.
CPC ............. *F24H 9/0026* (2013.01); *F23R 3/04* (2013.01); *F24H 9/1836* (2013.01);
(Continued)

(58) Field of Classification Search
CPC .... F24H 9/0026; F24H 9/1836; F24H 9/2035; G01F 1/42; G01F 1/40; G01L 19/147; F23N 2005/181
See application file for complete search history.

(56) References Cited

U.S. PATENT DOCUMENTS 1,419,876 A * 6/1922 Mapelsden ............... G01F 1/42
138/44
1,559,156 A * 10/1925 Bullock .................... G01F 1/42
73/861.61
(Continued)

FOREIGN PATENT DOCUMENTS

JP 2016020795 A 2/2016
KR 10-2004-0060126 A 7/2004
(Continued)

OTHER PUBLICATIONS

First Examination Report for corresponding Australian Patent Application No. 2020223747, dated Sep. 2, 2021, 5 pages long.
(Continued)

*Primary Examiner* — Michael G Hoang
*Assistant Examiner* — Andrew W Cheung
(74) *Attorney, Agent, or Firm* — Wegman Hessler

(57) ABSTRACT

A bell mouth includes an upstream body including an upstream-side opening formed to allow air introduced from an air supply duct to pass through and an upstream measurement portion connected with a differential-pressure acquisition device that uses pressure of the air in the upstream-side opening, in which the air supply duct guides the air into a water-heating device from the outside, a differential-pressure generation part that is located downstream of the upstream body with respect to a flow direction of the air and that has a structure that reduces the pressure of the air passing through the differential-pressure generation part, and a downstream body including a downstream-side opening formed to allow the air passing through the differential-pressure generation part to pass through and a downstream measurement portion connected with the differential-pressure acquisition device that obtains a difference between the pressure of the air passing through the downstream-side opening and facing toward a blower of the
(Continued)

water-heating device and the pressure of the air in the upstream-side opening.

13 Claims, 12 Drawing Sheets

(51) Int. Cl.
    *G01F 1/42*     (2006.01)
    *G01F 1/40*     (2006.01)
    *F24H 9/00*     (2022.01)
    *F24H 9/1836*     (2022.01)
    *F23N 5/18*     (2006.01)

(52) U.S. Cl.
    CPC .............. *F24H 9/2035* (2013.01); *G01F 1/40* (2013.01); *G01F 1/42* (2013.01); *F23N 2005/181* (2013.01)

(56) References Cited

U.S. PATENT DOCUMENTS

| | | | | |
|---|---|---|---|---|
| 1,850,030 | A * | 3/1932 | Pardoe | G01F 1/44 73/861.64 |
| 2,929,248 | A * | 3/1960 | Sprenkle | G01F 15/00 138/40 |
| 4,249,164 | A * | 2/1981 | Tivy | G01F 1/42 340/611 |
| 4,528,847 | A * | 7/1985 | Halmi | G01F 1/42 73/195 |
| 9,329,065 | B2 * | 5/2016 | Mashak | G01F 1/42 |
| 2003/0097880 | A1 * | 5/2003 | Ciobanu | G01F 1/42 73/861.52 |
| 2008/0125916 | A1 * | 5/2008 | Ellender | G01F 15/0755 700/282 |
| 2009/0084328 | A1 * | 4/2009 | Lyons | F24H 9/148 122/13.01 |
| 2009/0308332 | A1 * | 12/2009 | Tanbour | F24H 9/0026 122/19.2 |
| 2010/0154723 | A1 * | 6/2010 | Garrabrant | F23M 11/02 122/17.1 |
| 2011/0315905 | A1 * | 12/2011 | Hirose | G01F 1/40 251/12 |
| 2016/0084686 | A1 * | 3/2016 | Khalifa | G01F 1/3218 73/861.24 |
| 2018/0172519 | A1 * | 6/2018 | Bessette | G01L 19/0038 |
| 2019/0219470 | A1 * | 7/2019 | Choo | G01L 13/06 |

FOREIGN PATENT DOCUMENTS

| | | |
|---|---|---|
| KR | 10-0870887 B | 11/2008 |
| KR | 10-1932992 B | 12/2018 |
| WO | 2014182053 A1 | 11/2014 |

OTHER PUBLICATIONS

First Office Action for Korean Patent Application No. 10-2019-0113102 dated Oct. 18, 2021, 8 pages long.

* cited by examiner

BELL MOUTH, AIR SUPPLY ASSEMBLY INCLUDING THE BELL MOUTH, AND AIR SUPPLY CONTROL SYSTEM USING THE BELL MOUTH

CROSS-REFERENCE TO RELATED APPLICATION

This application claims the benefit of priority to Korean Patent Application No. 10-2019-0113102, filed in the Korean Intellectual Property Office on Sep. 11, 2019, the entire contents of which are incorporated herein by reference.

TECHNICAL FIELD

The present disclosure relates to a bell mouth of a water-heating device, an air supply assembly including the bell mouth, and an air supply control system using the bell mouth.

BACKGROUND

A water-heating device is a device that transfers heat generated by a combustion reaction to water to heat the water and uses the heated water for heating or the supply of hot water. A process in which water is introduced, heated, and then released is performed through the water-heating device.

A combustion reaction may be performed in a burner. The burner requires a fuel gas and air to cause the combustion reaction. Air around the water-heating device may be used for the combustion reaction. Accordingly, the air around the water-heating device may be suctioned and supplied into the burner.

To stably perform the combustion reaction, the flow rate of the air supplied into the burner has to be stably maintained. However, an environment does not always remain constant, and a blower supplying the air into the burner may differently operate depending on situations. Accordingly, even in the case of an environmental change, it is necessary to stably maintain the flow rate of the air supplied into the burner.

SUMMARY

The present disclosure has been made to solve the above-mentioned problems occurring in the prior art while advantages achieved by the prior art are maintained intact.

An aspect of the present disclosure provides a bell mouth of a water-heating device for stably maintaining the flow rate of air supplied into a burner, an air supply assembly including the bell mouth, and an air supply control system using the bell mouth.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a bell mouth includes an upstream body including an upstream-side opening formed to allow air introduced from an air supply duct to pass through and an upstream measurement portion connected with a differential-pressure acquisition device that uses pressure of the air in the upstream-side opening, in which the air supply duct guides the air into a water-heating device from the outside, a differential-pressure generation part that is located downstream of the upstream body with respect to a flow direction of the air and that has a structure that reduces the pressure of the air passing through the differential-pressure generation part, and a downstream body including a downstream-side opening formed to allow the air passing through the differential-pressure generation part to pass through and a downstream measurement portion connected with the differential-pressure acquisition device that obtains a difference between the pressure of the air passing through the downstream-side opening and facing toward a blower of the water-heating device and the pressure of the air in the upstream-side opening.

According to another aspect of the present disclosure, an air supply control system of a water-heating device includes a blower that forcibly feeds air into a burner of the water-heating device, a bell mouth that delivers, to the blower, the air introduced from outside the water-heating device, a differential-pressure acquisition device connected to the bell mouth to obtain a differential pressure of the air passing through the bell mouth, and a processor that receives the obtained differential pressure and controls the blower, based on the obtained differential pressure. The bell mouth includes an upstream-side opening formed to allow the introduced air to pass through, a differential-pressure generation part that is located downstream of the upstream-side opening with respect to a flow direction of the air and that has a structure that reduces pressure of the air passing through the differential-pressure generation part, and a downstream-side opening formed to allow the air passing through the differential-pressure generation part to pass through. The differential pressure obtained by the differential-pressure acquisition device corresponds to a difference between pressure in the upstream-side opening and pressure in the downstream-side opening.

According to another aspect of the present disclosure, an air supply assembly includes an air supply duct including a duct body that guides introduced air downward, a redirection portion that guides the air from the duct body in one direction parallel to a horizontal direction, and a stabilizing portion extending from the redirection portion along a flow direction of the air changed in the redirection portion, and a bell mouth including a differential-pressure generation part and a measurement portion, in which the differential-pressure generation part is formed to allow the air delivered from the stabilizing portion to pass through and has a structure that reduces pressure of the air passing through the differential-pressure generation part, and the measurement portion is connected to a differential-pressure acquisition device that obtains a difference between pressure upstream of the differential-pressure generation part and pressure downstream of the differential-pressure generation part with respect to the flow direction of the air. The stabilizing portion is longer than the redirection portion with respect to the flow direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
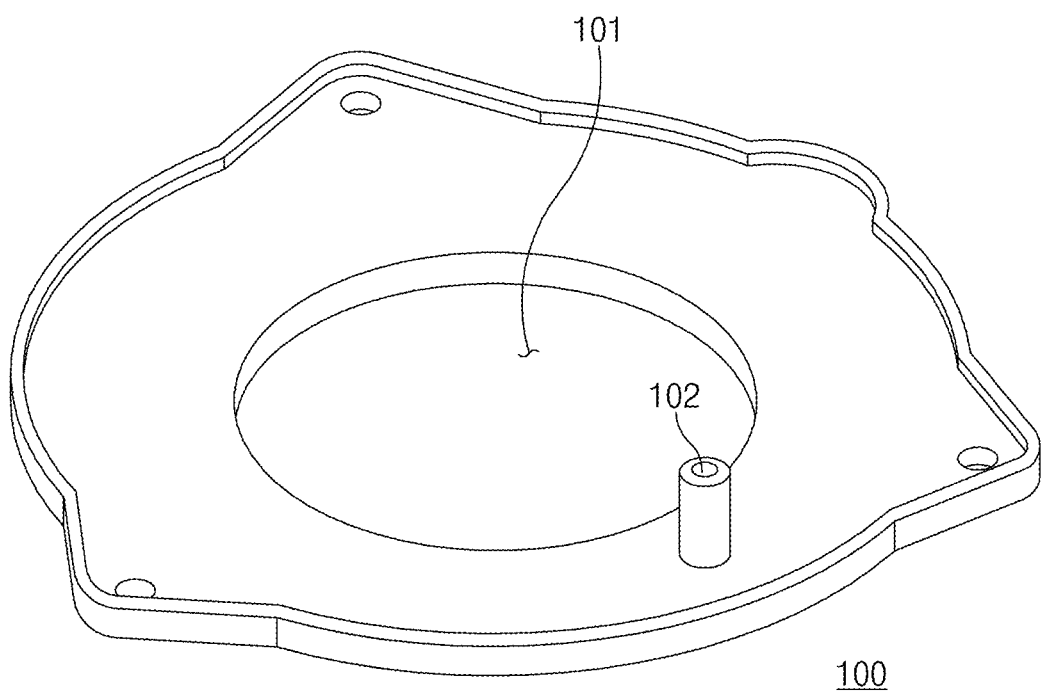
FIG. 1 is a perspective view of an exemplary bell mouth.

Hereinafter, exemplary embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the nature, sequence, or order of these components is not limited by these terms. When a component is described as "connected", "coupled", or "linked" to another component, this may mean the components are not only directly "connected", "coupled", or "linked" but also are indirectly "connected", "coupled", or "linked" via a third component.

Figure 2:
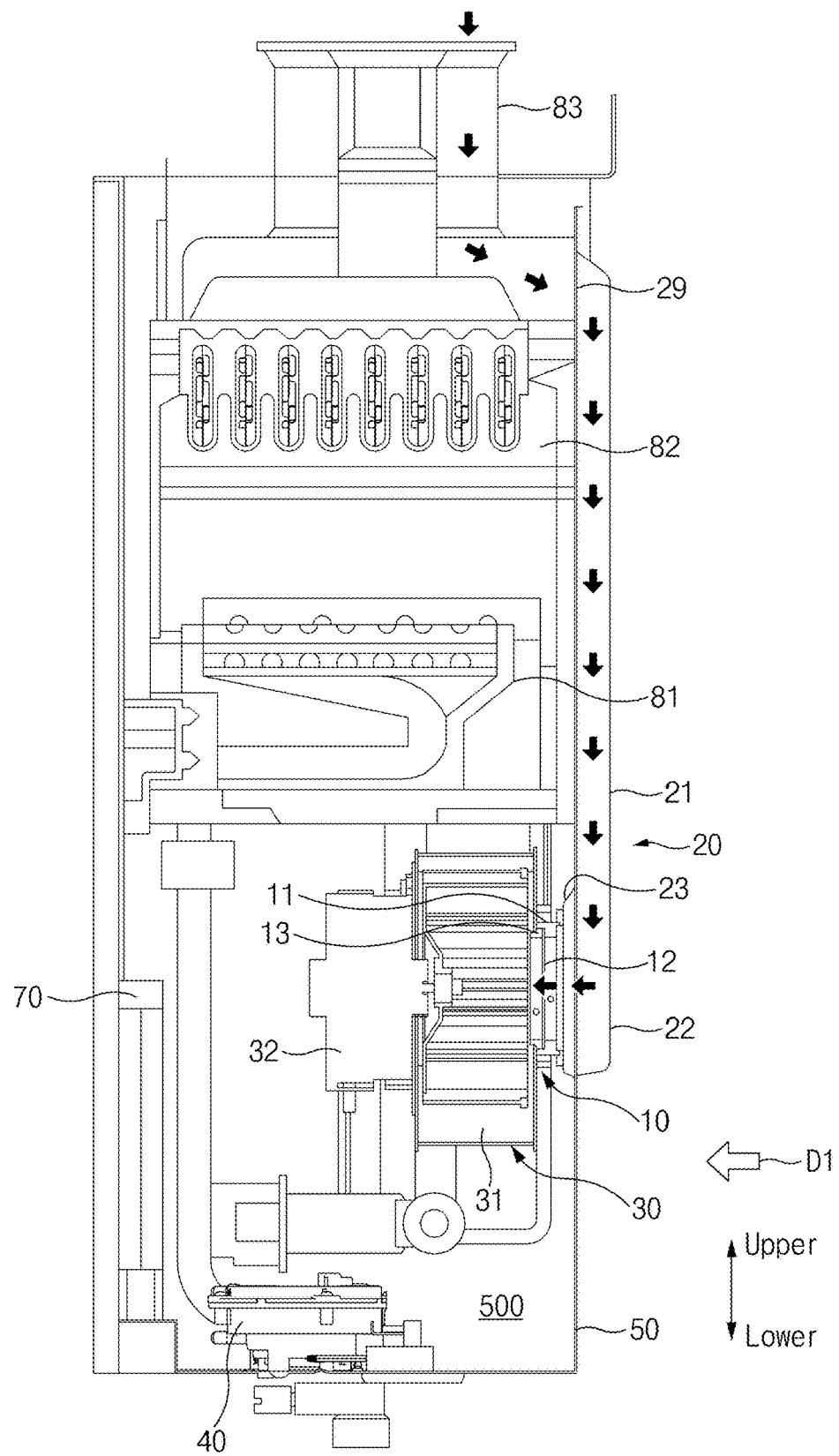
FIG. 2 is a view illustrating an internal structure of a water-heating device according to an embodiment of the present disclosure.
Figure 3:
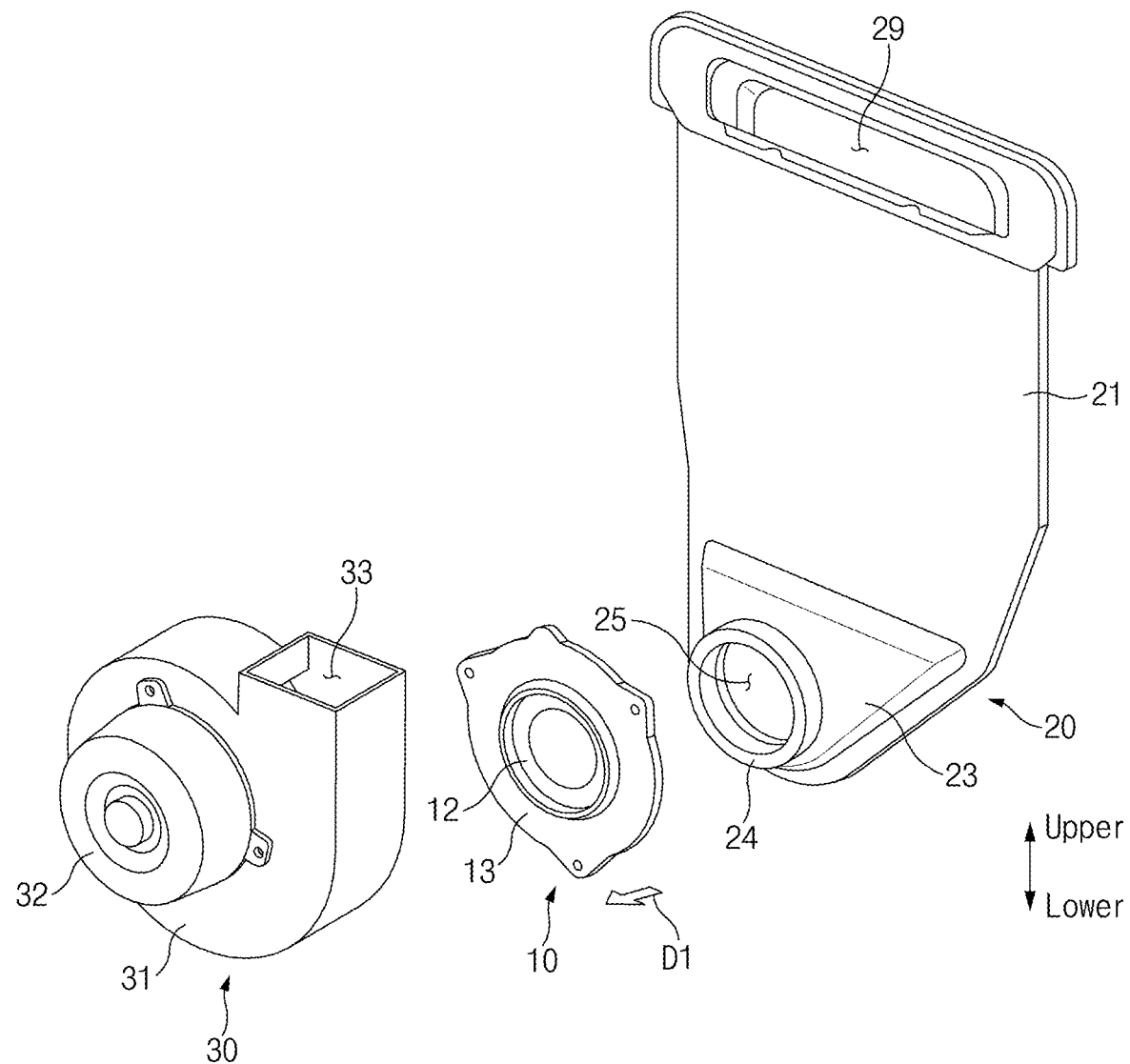
FIG. 3 is an exploded perspective view illustrating an air supply assembly and a blower according to an embodiment of the present disclosure.

FIG. 1 is a perspective view of an exemplary bell mouth 100. FIG. 2 is a view illustrating an internal structure of a water-heating device according to an embodiment of the present disclosure. FIG. 3 is an exploded perspective view illustrating an air supply assembly and a blower 30 according to an embodiment of the present disclosure.

The water-heating device according to an embodiment of the present disclosure may include a case 50. Other components may be fixed in such a manner as to be embedded in or coupled to the case 50. The case 50 may support the components of the water-heating device. Air may be introduced from the outside through an air supply duct 20 and may be delivered to a bell mouth 10 and the blower 30, and the blower 30 may forcibly feed the air into a burner 81.

The exemplary bell mouth 100 may connect the blower 30 and the air supply duct 20 and may include a measurement portion 102 connected with a differential-pressure acquisition device 40 through a hose such that the differential-pressure acquisition device 40 obtains reduced pressure of air passing through an opening 101 of the bell mouth 100. The differential-pressure acquisition device 40 in the exemplary water-heating device may obtain negative pressure generated in the bell mouth 100 and the pressure in the case 50. Based on a differential pressure, a processor 70 may control the blower 30 and may control the flow rate of air supplied into the burner 81.

However, in a case where the pressure in an interior space 500 of the case 50 changes, the blower 30 may not be appropriately controlled. In particular, this situation may occur in a water-heating device in which forced air-supply and exhaust and forced exhaust are mixed or selectively used. Specifically, in a situation in which the water-heating device is operated by the forced air-supply and exhaust method, the pressure in the interior space 500 of the case 50 may remain equal to the atmospheric pressure, and in a situation in which the water-heating device is operated by the forced exhaust method, the pressure in the interior space 500 of the case 50 may be lower than the atmospheric pressure.

The water-heating device according to an embodiment of the present disclosure may include the burner 81, a heat exchanger 82, the blower 30, the bell mouth 10, the differential-pressure acquisition device 40, the air supply duct 20, and the processor 70.

Due to the shapes of the bell mouth 10 and the air supply duct 20 of the water-heating device according to the embodiment of the present disclosure and the position to which the differential-pressure acquisition device 40 is connected, the processor 70 may control the blower 30 to deliver air to the burner 81 at a stable flow rate even in the situation in which the pressure in the case 50 changes.

The air supply duct 20 may be a component through which air is introduced into the water-heating device from the outside. The air supply duct 20 connected with an air-supply and exhaust pipe 83 may guide the air into the water-heating device from the outside, and the air may be delivered to the burner 81 through the bell mouth 10 and the blower 30. The air-supply and exhaust pipe 83 may be formed in the form of a double pipe to enable air supply and exhaust.

The air introduced into the air supply duct 20 from above the water-heating device may flow downward through the air supply duct 20 and may be released from the air supply duct 20 through the bell mouth 10. Accordingly, the air supply duct 20 may have a shape extending along an up-down direction and may have an empty space formed therein for delivering the air. In the embodiment of the present disclosure, for convenience of description, the direction in which the air supply duct 20 extends is expressed as the up-down direction. However, this is illustrative, and the direction may be changed depending on a way in which the water-heating device is arranged.

The air supply duct 20 may include a duct body 21, a redirection portion 22, and a stabilizing portion 23. The air supply duct 20 may further include an air inlet 29 and an air outlet 25. The components of the air supply duct 20 will be described below in detail with reference to FIG. 8.

The processor 70 may be electrically connected with the blower 30 and the differential-pressure acquisition device 40 and may control the blower 30 using a differential pressure value calculated from the pressure obtained by the differential-pressure acquisition device 40. The processor 70 may include a microprocessor such as a field programmable gate array (FPGA), an application specific integrated circuit (ASIC), or a central processing unit (CPU). However, the type of a computing device included in the processor 70 is not limited thereto.

Furthermore, the processor 70 may include a memory that stores a plurality of control instructions, on the basis of which the processor 70 generates commands for controlling the components. The processor 70 may be programmed to receive the control instructions from the memory and generate electrical signals for controlling the components, based on the received control instructions. The memory may be a data store such as a hard disk drive (HDD), a solid state drive (SSD), a volatile medium, a non-volatile medium, or the like. However, the type of the memory is not limited thereto.

The burner 81 may burn a fuel gas and the supplied air together. Heat and combustion gases may be generated by the combustion reaction.

The heat exchanger 82 may transfer the heat generated by the combustion reaction in the burner 81 to heating water. The heat exchanger 82 may include a tube and a housing that forms an interior space in which the tube is received. While water flows through the tube, the combustion gases may flow around the tube, and the heat generated by the combustion reaction in the burner 81 may be transferred to the water to heat the water.

The differential-pressure acquisition device 40 may obtain a differential pressure. The differential-pressure acquisition device 40 may be connected to the bell mouth 10 and may obtain a differential pressure of the air passing through the bell mouth 10. Specifically, the differential-pressure acquisition device 40 may be connected to an upstream measurement portion 111 and a downstream measurement portion 131 formed in the bell mouth 10 according to an embodiment of the present disclosure. The differential-pressure acquisition device 40 may obtain the pressure of the air in the upstream measurement portion 111 and the pressure of the air in the downstream measurement portion 131 and may transfer a differential pressure value in the form of an electrical signal to the processor 70, or may transfer the obtained pressures to the processor 70 as electrical signals, such that the processor 70 calculates the differential pressure.

The differential-pressure acquisition device 40 may be a device that obtains a differential pressure between two points using a diaphragm. However, a method for obtaining pressures or a differential pressure is not limited thereto.

The blower 30 may forcibly feed the air introduced by the air supply duct 20 into the burner 81. The blower 30 may be connected with the burner 81, with an outlet 33 of a blower body 31 facing toward the burner 81. The blower 30 may be connected with the air supply duct 20 through the bell mouth 10. Depending on operation of the blower 30, an air flow may be generated in the water-heating device. The blower 30 may include a drive part 32, such as a motor, which generates a driving force using electric power. The blower 30 may forcibly feed the air using the driving force generated from the drive part 32.

Bell Mouth (10)

Figure 4:
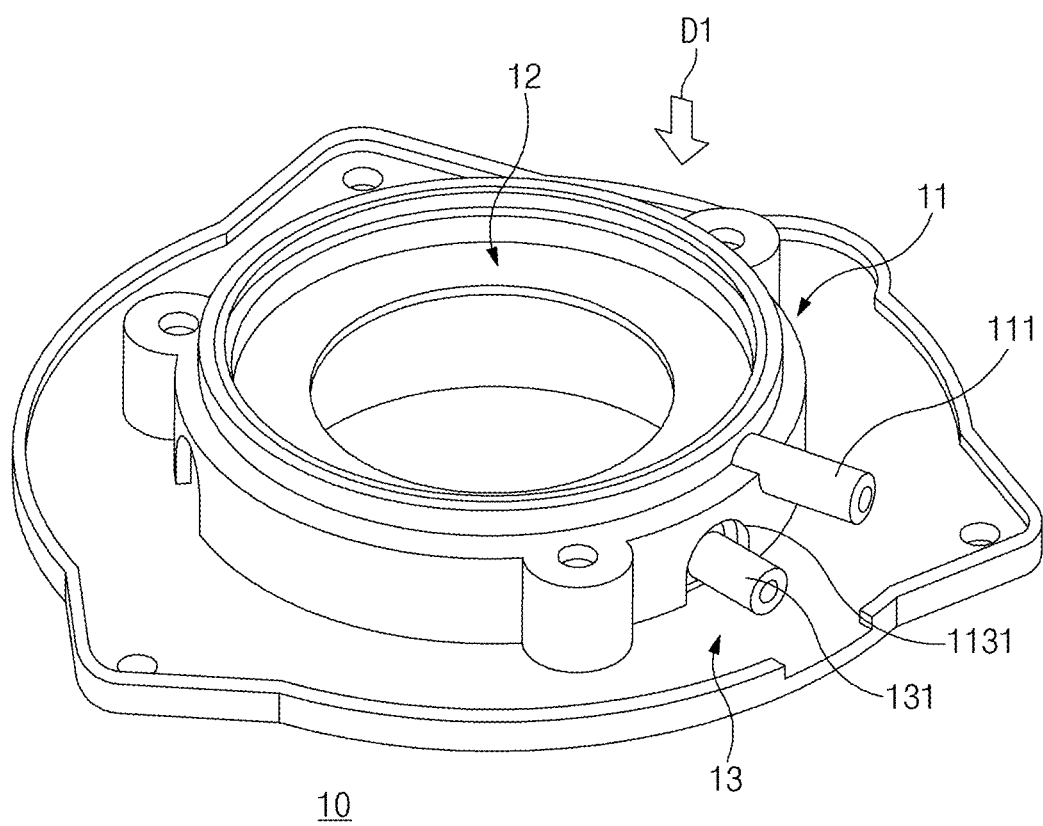
FIG. 4 is a perspective view illustrating a bell mouth according to an embodiment of the present disclosure.
Figure 5:
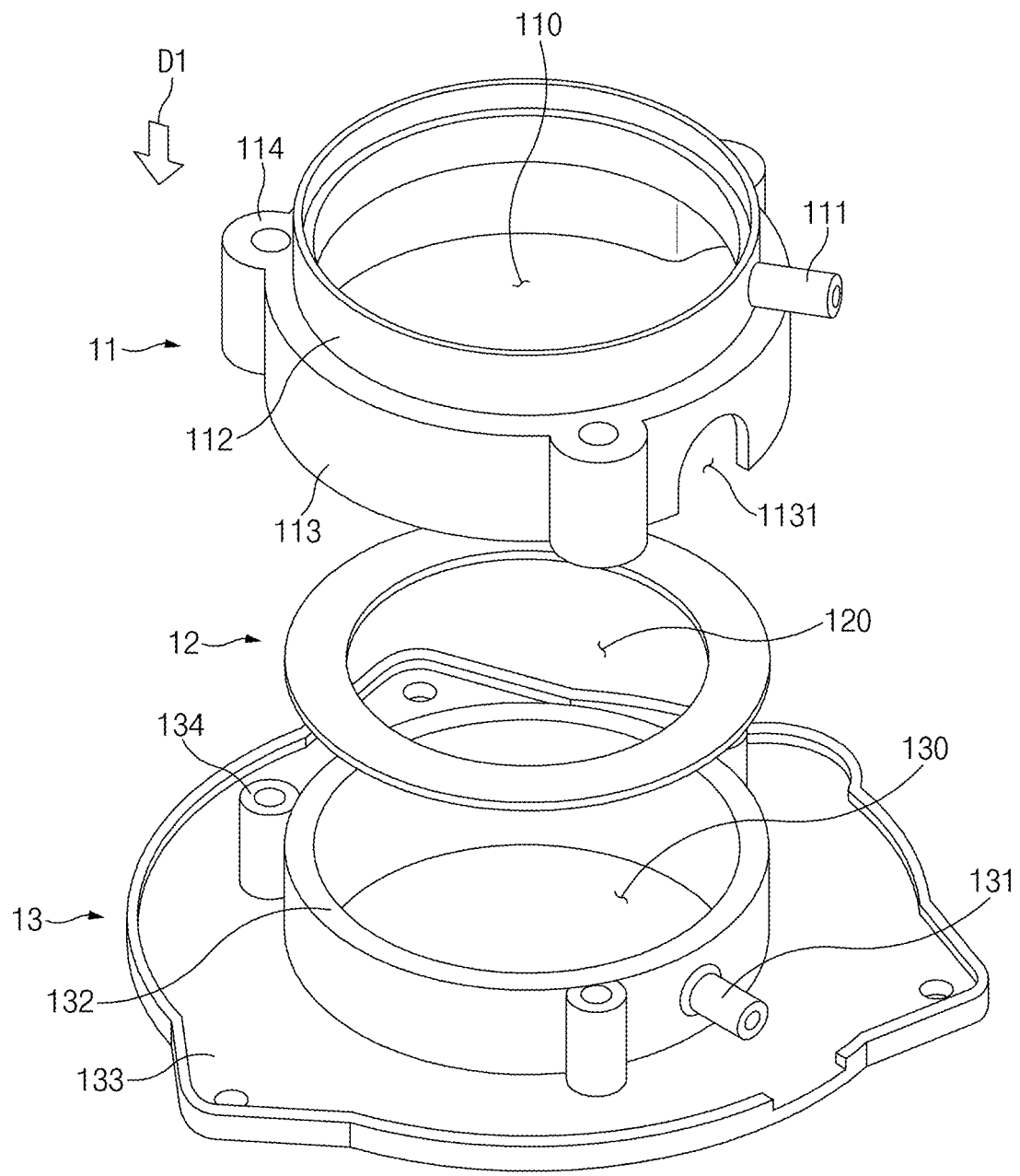
FIG. 5 is an exploded perspective view illustrating the bell mouth according to an embodiment of the present disclosure.

FIG. 4 is a perspective view illustrating the bell mouth 10 according to an embodiment of the present disclosure. FIG. 5 is an exploded perspective view illustrating the bell mouth 10 according to an embodiment of the present disclosure.

The bell mouth 10 may connect the air supply duct 20 and the blower 30. The bell mouth 10 may include an upstream body 11, a downstream body 13, and a differential-pressure generation part 12 located between the upstream body 11 and the downstream body 13.

The upstream body 11 may be located on an upstream side of the bell mouth 10 with respect to a flow direction D1 of the air. Hereinafter, the flow direction D1 in which the air flows in the upstream body 11 is abbreviated as the flow direction D1. The flow direction D1 may be a direction perpendicular to the up-down direction. The upstream body 11 may be connected with the air supply duct 20 by making direct contact with the air supply duct 20.

The upstream body 11 may include an upstream-side opening 110 and the upstream measurement portion 111. The air released from the air outlet 25 of the air supply duct 20 may pass through the upstream-side opening 110. The upstream body 11 may include an annular upstream ring portion 112 that defines the upstream-side opening 110 and an upstream surrounding portion 113 protruding from the periphery of the upstream ring portion 112 along the flow direction D1. The upstream ring portion 112 may meet the air outlet 25 of the air supply duct 20.

The upstream-side opening 110 may be formed in a circular shape. Accordingly, the inner circumferential surface of the upstream ring portion 112 may be formed in a circular shape and may define the upstream-side opening 110.

The upstream measurement portion 111 may be a portion of the upstream body 11 that is connected to the differential-pressure acquisition device 40. The upstream measurement portion 111 may protrude from the upstream ring portion 112, and an opposite end of a hose, one end of which is connected to the differential-pressure acquisition device 40, may be connected to the upstream measurement portion 111. Accordingly, the upstream measurement portion 111 and the differential-pressure acquisition device 40 may be connected with each other through the hose.

To guide the air from the upstream-side opening 110 to the differential-pressure acquisition device 40, the upstream measurement portion 111 may extend from the upstream ring portion 112 in a direction across the flow direction D1. The air in the upstream-side opening 110 may be delivered to the differential-pressure acquisition device 40, which is connected to the upstream measurement portion 111, through a hole that is formed from the inner surface of the upstream ring portion 112, which defines the upstream-side opening 110, to a tip end of the upstream measurement portion 111. The pressure in the upstream-side opening 110 may be used by the differential-pressure acquisition device 40.

To guide the air from the upstream-side opening 110 to the differential-pressure acquisition device 40, the upstream measurement portion 111 may extend across the flow direction D1. The direction in which the upstream measurement portion 111 protrudes may be perpendicular to the flow direction D1.

The upstream surrounding portion 113, together with the upstream ring portion 112, may form an insertion space into which a downstream ring portion 132 is inserted. The upstream surrounding portion 113 may also be formed in an annular shape, and the outer surface of the downstream ring portion 132 may be formed in a cylindrical shape. Accordingly, the insertion space may be formed in a cylindrical shape.

The upstream surrounding portion 113 may be open in the radial direction such that a measurement portion insertion hole 1131 is formed. When the downstream body 13 and the upstream body 11 are combined with each other, the downstream measurement portion 131 may pass through the measurement portion insertion hole 1131. The measurement portion insertion hole 1131 may be formed in the upstream surrounding portion 113 to correspond to the downstream measurement portion 131 of the downstream body 13.

The cross-sectional area of an inner profile in a section obtained by cutting the upstream surrounding portion 113 with a plane perpendicular to the flow direction D1 may be larger than the cross-sectional area of the upstream-side opening 110. Accordingly, when the downstream ring portion 132 is inserted into the insertion space, a surface of the upstream ring portion 112 that faces in the flow direction D1 may prevent an additional movement of the downstream ring portion 132 in the opposite direction to the flow direction D1. Furthermore, the inner surface of the upstream surrounding portion 113 may prevent an escape of the downstream ring portion 132 in a direction perpendicular to the flow direction D1.

The upstream body 11 may further include upstream coupling portions 114. The upstream coupling portions 114 may protrude outward from the upstream surrounding portion 113. The upstream coupling portions 114 may have holes to which fasteners are fastened, respectively. The upstream coupling portions 114 may cover downstream coupling portions 134 such that the holes of the upstream coupling portions 114 are aligned with holes of the downstream coupling portions 134 that will be described below. In this state, the fasteners may be fastened to the holes, and the upstream body 11 and the downstream body 13 may be combined with each other.

The differential-pressure generation part 12 may have a structure that reduces the pressure of the air passing through the differential-pressure generation part 12. The differential-pressure generation part 12 may be located downstream of the upstream body 11 and upstream of the downstream body 13 with respect to the flow direction D1 of the air. Accordingly, the pressure downstream of the differential-pressure generation part 12 may be lower than the pressure upstream of the differential-pressure generation part 12.

To allow the air to flow from the upstream-side opening 110 to a downstream-side opening 130, the differential-pressure generation part 12 may include a differential-pressure opening 120 formed through the differential-pressure generation part 12 along the flow direction D1. The diameter of the differential-pressure opening 120 may be smaller than the diameter of the upstream-side opening 110 and the diameter of the downstream-side opening 130 that will be described below. The differential-pressure generation part 12 may be formed in a circular ring shape and may have the circular differential-pressure opening 120 in the center thereof. The differential-pressure generation part 12 may function as an orifice plate that causes a pressure change.

The differential-pressure generation part 12 may be fixed between the upstream ring portion 112 and the downstream ring portion 132 as the downstream ring portion 132 is inserted into the insertion space. The upstream body 11 and the downstream body 13 may be fastened or combined with each other to fix the differential-pressure generation part 12, thereby preventing an escape of the differential-pressure generation part 12.

The downstream body 13 may be located on a downstream side of the bell mouth 10 with respect to the flow direction D1 of the air. The downstream body 13 may be connected with the blower 30 by making direct contact with the blower 30.

The downstream body 13 may include the downstream-side opening 130 and the downstream measurement portion 131. The downstream-side opening 130 may be formed to allow the air passing through the differential-pressure generation part 12 to pass through.

The air passing through the differential-pressure generation part 12 may pass through the downstream-side opening 130. Accordingly, the downstream body 13 may include the annular downstream ring portion 132 that defines the downstream-side opening 130.

The downstream-side opening 130 may be formed in a circular shape. Accordingly, the inner circumferential surface of the downstream ring portion 132 may be formed in a circular shape and may define the downstream-side opening 130.

The upstream-side opening 110 may have a smaller diameter than the downstream-side opening 130. The upstream-side opening 110, the downstream-side opening 130, and the differential-pressure opening 120 may form concentric circles.

The downstream body 13 may further include downstream coupling portions 134. The downstream coupling portions 134 may protrude outward from the downstream ring portion 132 and may have the holes to which the fasteners are fastened. The downstream coupling portions 134 may be combined with the upstream coupling portions 114 as described above.

The downstream body 13 may further include a downstream plate 133. The downstream plate 133 may be formed to surround the downstream ring portion 132 and may be disposed on the exterior of a tip end of the downstream ring portion 132 with respect to the flow direction D1. The downstream plate 133 may be attached to the blower 30.

The downstream measurement portion 131 may be a portion of the downstream body 13 that is connected to the differential-pressure acquisition device 40. The downstream measurement portion 131 may protrude from the downstream ring portion 132, and an opposite end of a hose, one end of which is connected to the differential-pressure acquisition device 40, may be connected to the downstream measurement portion 131. Accordingly, the downstream measurement portion 131 and the differential-pressure acquisition device 40 may be connected with each other through the hose.

As the upstream measurement portion 111 and the downstream measurement portion 131 are connected to the differential-pressure acquisition device 40, the differential-pressure acquisition device 40 may measure a differential pressure between the two measurement portions. As the upstream measurement portion 111 is connected to the upstream-side opening 110 and the downstream measurement portion 131 is connected to the downstream-side opening 130, the differential-pressure acquisition device 40 may obtain the difference between the pressure in the upstream-side opening 110 and the pressure in the downstream-side opening 130.

To guide the air from the downstream-side opening 130 to the differential-pressure acquisition device 40, the downstream measurement portion 131 may extend across the flow direction D1. Meanwhile, the direction in which the upstream measurement portion 111 extends may not be parallel to the direction in which the downstream measurement portion 131 extends.

The downstream ring portion 132, as described above, may be inserted into the insertion space to fix the differential-pressure generation part 12. The downstream ring portion 132 may be formed in an annular shape. The downstream ring portion 132, when inserted into the insertion space, may fix the differential-pressure generation part 12 and may allow the upstream-side opening 110, the downstream-side opening 130, and the differential-pressure opening 120 to be aligned with one another.

An air supply control system of the water-heating device according to an embodiment of the present disclosure may include the blower 30, the bell mouth 10, the differential-pressure acquisition device 40, and the processor 70. Due to the shape of the bell mouth 10 and the connection relationship with the differential-pressure acquisition device 40, the air supply control system according to the embodiment of the present disclosure may not use the pressure in the interior space 500 of the case 500 to calculate a differential pressure and may identify only a difference in pressure between the front and rear ends of the bell mouth 10 that the differential-pressure generation part forms. Accordingly, the blower 30 may be controlled irrespective of a change in the pressure in the interior space 500 of the case 50. The blower 30 may operate to allow the differential pressure between the front and rear ends of the differential-pressure generation part 12 to remain constant, and thus the water-heating device may be smoothly operated.

Figure 6:
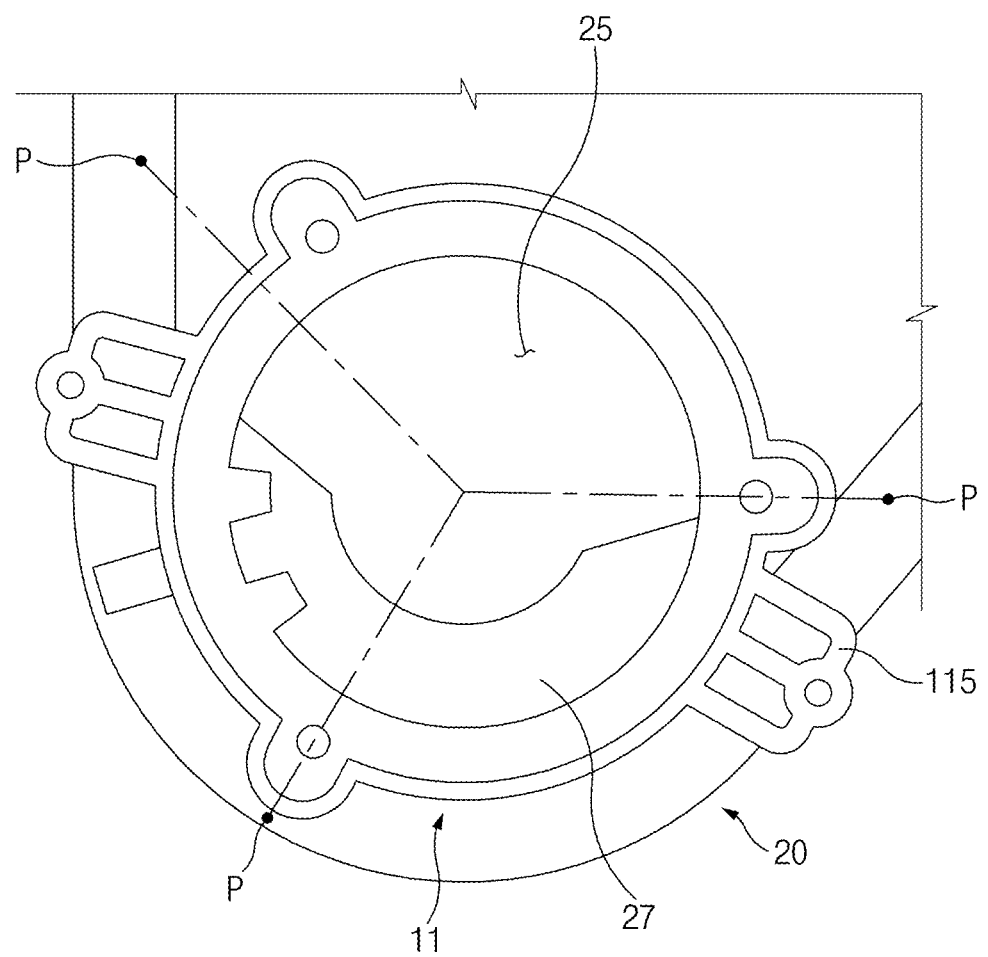
FIG. 6 is a view illustrating a form in which an upstream body of the bell mouth is coupled to an air supply duct according to an embodiment of the present disclosure.
Figure 7:
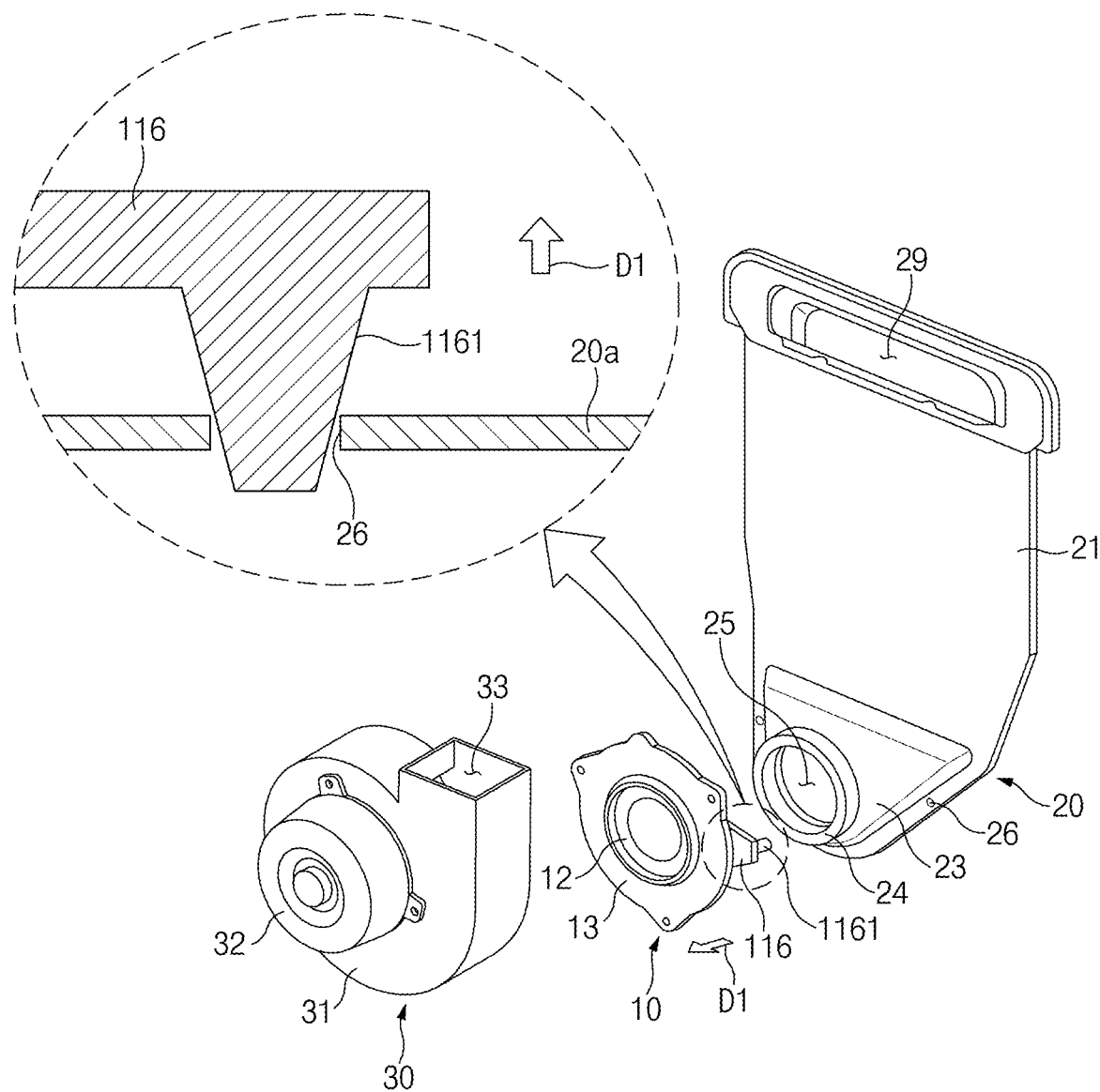
FIG. 7 is a view illustrating a coupling structure between the upstream body of the bell mouth and the air supply duct according to a modified example of the embodiment of the present disclosure.

FIG. 6 is a view illustrating a form in which the upstream body 11 of the bell mouth 10 is coupled to the air supply duct 20 according to an embodiment of the present disclosure. FIG. 7 is a view illustrating a coupling structure between the upstream body 11 of the bell mouth 10 and the air supply duct 20 according to a modified example of the embodiment of the present disclosure.

According to an embodiment of the present disclosure, the upstream body 11 of the bell mouth 10 may include a plurality of bell mouth fixing portions 115 protruding outward from the upstream ring portion 112. The bell mouth fixing portions 115 may be fixedly coupled to the air supply duct 20. As illustrated in FIG. 6, two bell mouth fixing portions 115 may be formed. The two bell mouth fixing portions 115 may be disposed to be spaced apart from each other at a predetermined interval.

The bell mouth fixing portions 115 may each include a hole formed therein as illustrated. The bell mouth fixing portions 115 may be fixedly coupled to the air supply duct 20 by fasteners passing through the holes. Screws may be used as the fasteners. However, the fasteners are not limited thereto.

In a modified example of the embodiment of the present disclosure, the upstream body 11 may further include bell mouth fixing protrusions 1161. Three bell mouth fixing protrusions 1161 may be formed on three fixing protrusion connecting portions 116, respectively, so as to reach three points illustrated in FIG. 6. The three fixing protrusion connecting portions 116 may protrude outward from the upstream ring portion 112. As the three points are spaced apart from each other and the intervals therebetween are similarly maintained, the bell mouth 10 may be stably fixed to the air supply duct 20 with a small amount of eccentricity.

The air supply duct 20 may further include coupling holes 26 formed in positions corresponding to the positions of the plurality of bell mouth fixing protrusions 1161 such that the bell mouth 10 is fixed to a predetermined position as the plurality of bell mouth fixing protrusions 1161 are inserted into the coupling holes 26. Accordingly, as illustrated in FIG. 7, as the upstream body 11 approaches the air supply duct 20, the bell mouth fixing protrusions 1161 may be inserted into the coupling holes 26, and the bell mouth 10 may be fixedly located in a predetermined position at a predetermined angle.

Air Supply Duct (20)

Figure 8:
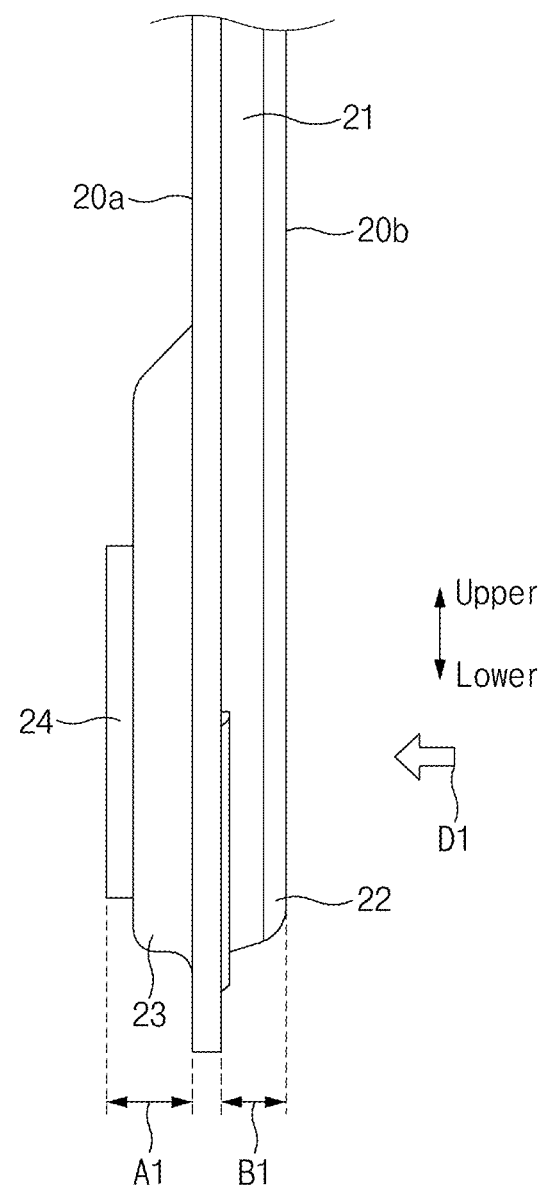
FIG. 8 is a side view of the air supply duct according to an embodiment of the present disclosure.

FIG. 8 is a side view of the air supply duct 20 according to an embodiment of the present disclosure.

Air may be introduced into the duct body 21 through the air inlet 29 of the air supply duct 20. The air may be guided downward along the duct body 21 and may change the flow direction in the redirection portion 22. The flow direction of the air may be changed to the horizontal direction in the redirection portion 22. The air, the flow direction of which is changed in the redirection portion 22, may flow along the horizontal direction through the stabilizing portion 23 that extends from the redirection portion 22 along the flow direction D1. The air may be released to the upstream-side opening 110 of the bell mouth through the air outlet 25 surrounded and defined by a stabilizing portion tip end 24 formed at an end of the stabilizing portion 23. The stabilizing portion tip end 24 may be formed in a circular ring shape. The stabilizing portion tip end 24 may have a stepped structure relative to the other part of the stabilizing portion 23. The stabilizing portion tip end 24 may make contact with the bell mouth 10.

The air may flow downward through the duct body 21, may change the flow direction while passing through the redirection portion 22, and may flow through the stabilizing portion 23 in the flow direction D1 parallel to the horizontal direction. Therefore, when the air is supplied into the bell mouth 10 and the blower 30 as soon as the flow direction of the air is changed, the differential-pressure acquisition device 40 may not be able to obtain a stable differential pressure value. This problem may be solved by making the length A1 of the stabilizing portion 23 greater than the length B1 of the redirection portion 22 with respect to the flow direction D1. As the air travels a predetermined distance without a change of direction, a differential pressure value may be stabilized. The bell mouth 10 according to the embodiment of the present disclosure may be combined with the above-described air supply duct 20 to form the air supply assembly, thereby providing a stable differential pressure value to the differential-pressure acquisition device 40.

Figure 9:
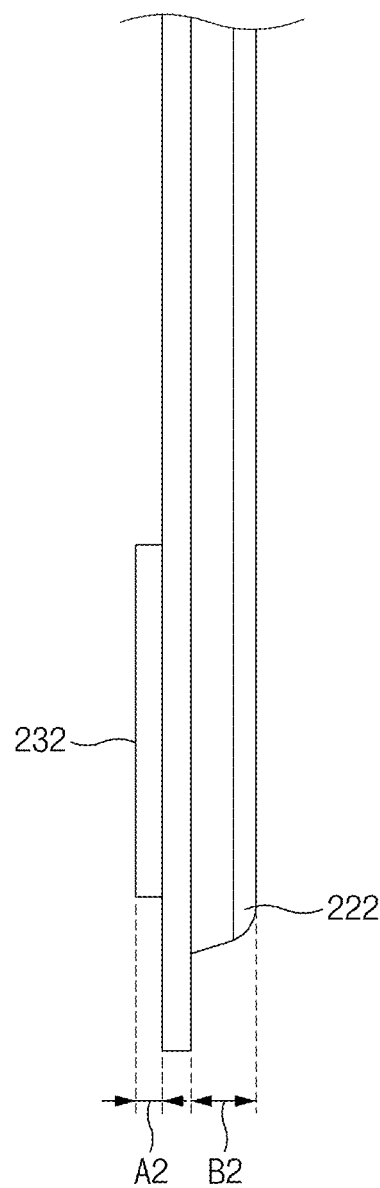
FIG. 9 is a side view of an air supply duct according to another embodiment of the present disclosure.

FIG. 9 is a side view of an air supply duct 202 according to another embodiment of the present disclosure.

Referring to FIG. 9, in the air supply duct 202 according to the other embodiment of the present disclosure, the length A2 of a stabilizing portion 232 may be smaller than the length B2 of a redirection portion 222 with respect to the flow direction D1.

Figure 10:
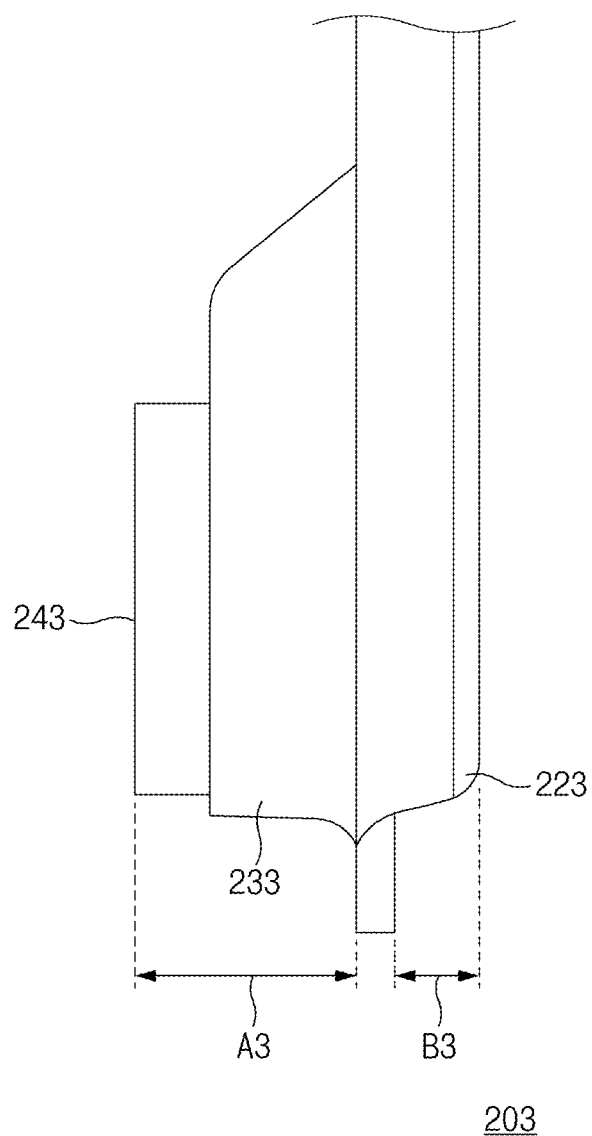
FIG. 10 is a side view of an air supply duct according to another embodiment of the present disclosure.

FIG. 10 is a side view of an air supply duct 203 according to another embodiment of the present disclosure.

Referring to FIG. 10, in the air supply duct 203 according to the other embodiment of the present disclosure, the length A3 of a stabilizing portion 233 may be two or more times greater than the length B3 of a redirection portion 223 with respect to the flow direction D1. The length B3 of the redirection portion 223 may be greater than the length of a cylindrical portion adjacent to a stabilizing portion tip end 243.

Figure 11:
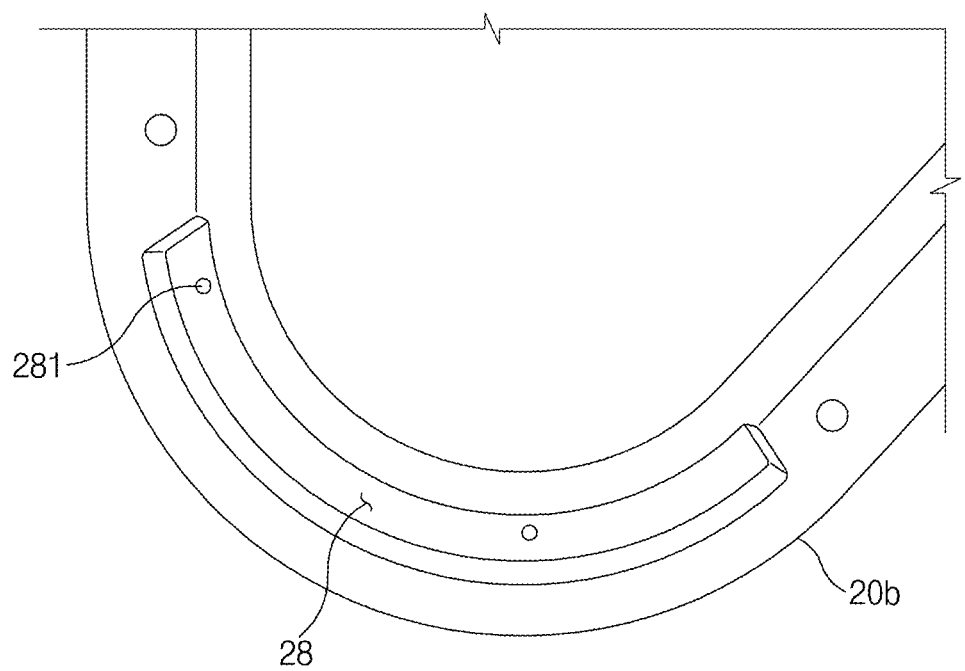
FIG. 11 is a view illustrating part of the inside of the air supply duct according to an embodiment of the present disclosure.
Figure 12:
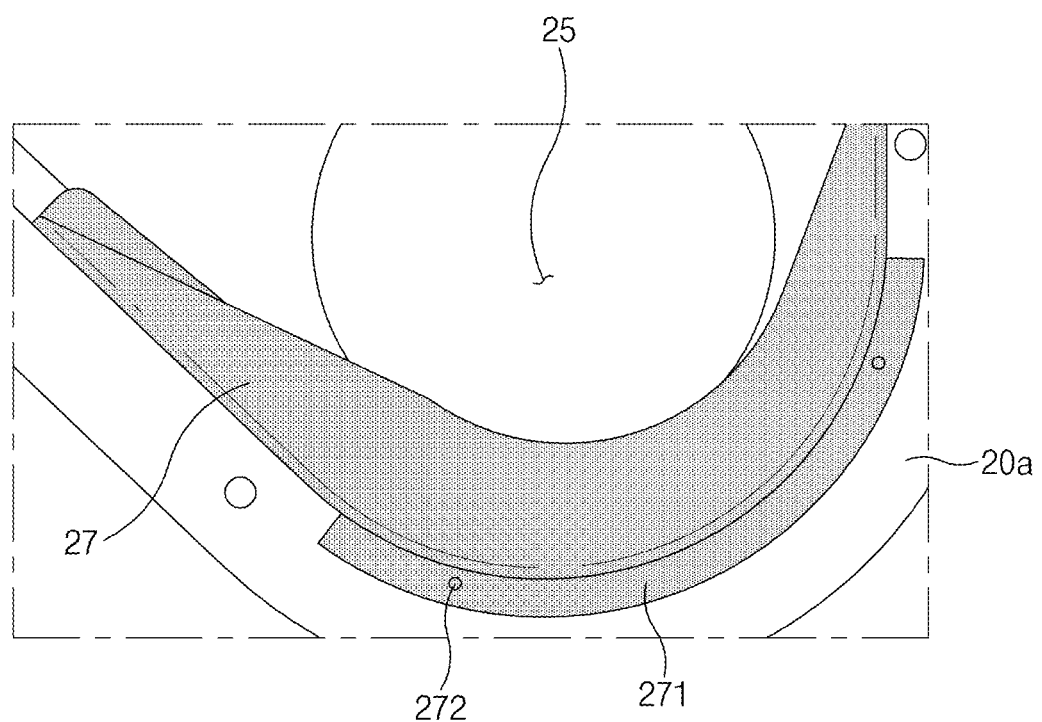
FIG. 12 is a view illustrating a guide part disposed in the air supply duct according to an embodiment of the present disclosure.

FIG. 11 is a view illustrating part of the inside of the air supply duct 20 according to an embodiment of the present disclosure. FIG. 12 is a view illustrating a guide part 27 disposed in the air supply duct 20 according to an embodiment of the present disclosure.

As described above, a differential pressure value may be stabilized by adjusting the length of the stabilizing portion 23. However, due to a problem in design dimensions, there may be a limitation in improving the stability of the differential pressure value by increasing the length of the stabilizing portion 23. To solve this problem, the air supply duct 20 according to an embodiment of the present disclosure may further include the guide part 27.

The guide part 27 may be disposed in the redirection portion 22 and may form a slope slighter than the slope of a lower end of the inner surface of the redirection portion 22 with respect to the vertical direction. The guide part 27 may be formed of a material having elasticity and may be formed to cover part of the inner surface of the redirection portion 22.

The guide part 27 may have guide fixing protrusions 272 that protrude in the opposite direction to the flow direction D1. The redirection portion 22 may have, in the inner surface thereof, insertion holes 281 into which the guide fixing protrusions 272 are inserted. As the guide fixing protrusions 272 are inserted into the insertion holes 281, the guide part 27 may be fixed to the redirection portion 22 well.

The air supply duct 20 may be formed in such a manner that a first plate 20a and a second plate 20b are pressed against each other, and an empty space between the first plate 20a and the second plate 20b spaced apart from each other may foil a passage through which air flows. Here, the first plate 20a may be a plate that faces in the flow direction D1 relative to the second plate 20b and on which the air outlet 25 and the stabilizing portion 23 are located. The redirection portion 22 may be located on the second plate 20b.

As the first plate 20a and the second plate 20b are combined to form the air supply duct 20, the integrated first plate 20a may be formed such that the redirection portion 22 and part of the duct body 21 are connected with each other, and the integrated second plate 20b may be foiled such that the stabilizing portion 23 and part of the duct body 21 are connected with each other.

The guide part 27 may include a guide fixing portion 271. The guide fixing portion 271 may be fixedly inserted into an insertion groove 28 formed by the first plate 20a and the second plate 20b spaced apart from each other. That is, the first plate 20a and the second plate 20b may be pressed against each other with the guide fixing portion 271 therebetween to fix the guide fixing portion 271, thereby preventing an escape of the guide part 27. The insertion holes 281 may be formed in part of the second plate 20b that forms the insertion groove 28, and the guide fixing protrusions 272 may be formed on the guide fixing portion 271. Accordingly, the guide part 27 may be more firmly fixed to the first plate 20a and the second plate 20b.

When the first plate 20a and the second plate 20b are pressed against each other with the guide part 27 therebetween, an escape of the guide part 27 from a desired position by pressure needs to be prevented. To achieve this, a pressing jig passing through the air outlet 25 may be used. The pressing jig may be formed in a three-dimensional shape having a cross-section corresponding to that of the air outlet 25. The air outlet 25 may be formed in a circular shape, and therefore the pressing jig may be formed in a cylindrical shape. The pressing jig may serve as a guide that passes through the air outlet 25 and presses the second plate 20b to prevent an escape of the guide part 27 in a process of pressing the guide part 27 toward the inside of the air supply duct 20.

According to the embodiments of the present disclosure, even in the case of a change in a surrounding environment, the water-heating device may be stably operated by stably maintaining the flow rate of air supplied into the burner.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A bell mouth comprising:
    an upstream body including an upstream-side opening formed to allow air introduced from an air supply duct to pass through and an upstream measurement portion connected with a differential-pressure acquisition device configured to use pressure of the air in the upstream-side opening, the air supply duct being configured to guide the air into a water-heating device from the outside;
    a differential-pressure generation part located downstream of the upstream body with respect to a flow direction of the air, the differential-pressure generation part having a structure configured to reduce the pressure of the air passing through the differential-pressure generation part; and
    a downstream body including a downstream-side opening formed to allow the air passing through the differential-pressure generation part to pass through and a downstream measurement portion connected with the differential-pressure acquisition device, wherein the differential-pressure acquisition device obtains a difference between the pressure of the air passing through the downstream-side opening and facing toward a blower of the water-heating device and the pressure of the air in the upstream-side opening,
    wherein the upstream body further includes an upstream ring portion having an inner circumferential surface configured to define the upstream-side opening and an upstream surrounding portion protruding from a periphery of the upstream ring portion along the flow direction to form, together with the upstream ring portion, an insertion space into which the downstream body is inserted, and
    wherein the upstream surrounding portion is open in the radial direction such that a measurement portion insertion hole through which the downstream measurement portion passes is formed.

2. The bell mouth of claim 1, wherein the differential-pressure generation part includes a differential-pressure opening formed through the differential-pressure generation part along the flow direction to allow the air to flow from the upstream-side opening to the downstream-side opening.

3. The bell mouth of claim 2, wherein the differential-pressure opening has a smaller diameter than the upstream-side opening and the downstream-side opening.

4. The bell mouth of claim 2, wherein the upstream-side opening has a smaller diameter than the downstream-side opening.

5. The bell mouth of claim 2, wherein the upstream-side opening, the downstream-side opening, and the differential-pressure opening form concentric circles.

6. The bell mouth of claim 1, wherein the upstream measurement portion extends along a direction across the flow direction to guide the air from the upstream-side opening to the differential-pressure acquisition device, and
wherein the downstream measurement portion extends along a direction across the flow direction to guide the air from the downstream-side opening to the differential-pressure acquisition device.

7. The bell mouth of claim 6, wherein the direction in which the upstream measurement portion extends and the direction in which the downstream measurement portion extends are not parallel to each other.

8. The bell mouth of claim 1, wherein the downstream body further includes a downstream ring portion having an inner circumferential surface configured to define the downstream-side opening,
wherein in the insertion space, the differential-pressure generation part is fixed between the upstream ring portion and the downstream ring portion when the downstream ring portion is inserted into the insertion space.

9. An air supply control system of a water-heating device, comprising:
a blower configured to forcibly feed air into a burner of the water-heating device;
a bell mouth configured to deliver, to the blower, the air introduced from outside the water-heating device;
a differential-pressure acquisition device connected to the bell mouth to obtain a differential pressure of the air passing through the bell mouth; and
a processor configured to receive the obtained differential pressure and control the blower, based on the obtained differential pressure,
wherein the bell mouth includes:
an upstream-side opening formed to allow the introduced air to pass through and defined by a upstream body;
a differential-pressure generation part located downstream of the upstream-side opening with respect to a flow direction of the air, the differential-pressure generation part having a structure configured to reduce pressure of the air passing through the differential-pressure generation part; and
a downstream-side opening formed to allow the air passing through the differential-pressure generation part to pass through and defined by a downstream body,
wherein the differential pressure obtained by the differential-pressure acquisition device corresponds to a difference between pressure in the upstream-side opening and pressure in the downstream-side opening,
wherein the upstream body includes an upstream ring portion having an inner circumferential surface configured to define the upstream-side opening and an upstream surrounding portion protruding from a periphery of the upstream ring portion along the flow direction to form, together with the upstream ring portion, an insertion space into which the downstream body is inserted,
wherein the downstream body includes a downstream measurement portion connected with the differential-pressure acquisition device, and
wherein the upstream surrounding portion is open in the radial direction such that a measurement portion insertion hole through which the downstream measurement portion passes is formed.

10. An air supply assembly comprising:
an air supply duct including a duct body configured to guide introduced air downward, a redirection portion configured to guide the air from the duct body in one direction parallel to a horizontal direction, and a stabilizing portion extending from the redirection portion along a flow direction of the air changed in the redirection portion;
a guide part disposed in the redirection portion and forming a slope slighter than a slope of a lower end of an inner surface of the redirection portion relative to a vertical direction; and
a bell mouth including a differential-pressure generation part and a measurement portion, the differential-pressure generation part being formed to allow the air delivered from the stabilizing portion to pass through and having a structure configured to reduce pressure of the air passing through the differential-pressure generation part, and the measurement portion being connected to a differential-pressure acquisition device configured to obtain a difference between pressure upstream of the differential-pressure generation part and pressure downstream of the differential-pressure generation part with respect to the flow direction of the air,
wherein the stabilizing portion is longer than the redirection portion with respect to the flow direction.

11. The air supply assembly of claim 10, wherein the redirection portion has, in the inner surface thereof, an insertion hole into which a guide fixing protrusion included in the guide part is inserted.

12. The air supply assembly of claim 10, wherein a first plate and a second plate are pressed against each other to form the air supply duct, and wherein the guide part includes a guide fixing portion fixedly inserted into an insertion groove formed by the first plate and the second plate spaced apart from each other.

13. The air supply assembly of claim 10, wherein the bell mouth has a plurality of bell mouth fixing protrusions, and
wherein the air supply duct has coupling holes in positions corresponding to positions of the plurality of bell mouth fixing protrusions such that the bell mouth is fixed to a predetermined position as the plurality of bell mouth fixing protrusions are inserted into the coupling holes.

* * * * *